United States Patent
Richard et al.

(10) Patent No.: US 11,093,054 B2
(45) Date of Patent: Aug. 17, 2021

(54) ELECTRONIC INPUT DEVICES WITH RADIAL FORCE SENSOR ARRAY

(71) Applicant: HEWLETT-PACKARD DEVELOPMENT COMPANY, L.P., Houston, TX (US)

(72) Inventors: Owen Richard, Fort Collins, CO (US); Fred Charles Thomas, III, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 557 days.

(21) Appl. No.: 16/077,750

(22) PCT Filed: Jul. 13, 2017

(86) PCT No.: PCT/US2017/041866
§ 371 (c)(1),
(2) Date: Aug. 14, 2018

(87) PCT Pub. No.: WO2019/013795
PCT Pub. Date: Jan. 17, 2019

(65) Prior Publication Data
US 2021/0200342 A1  Jul. 1, 2021

(51) Int. Cl.
*G06F 3/0354* (2013.01)
(52) U.S. Cl.
CPC ................. *G06F 3/03545* (2013.01)
(58) Field of Classification Search
CPC .... G06F 3/03545; G06F 3/0383; G06F 3/033; G06F 3/0346

USPC ................................................. 345/156, 179
See application file for complete search history.

(56) References Cited

U.S. PATENT DOCUMENTS

| | | | |
|---|---|---|---|
| 4,318,096 A | 3/1982 | Thornburg et al. | |
| 4,896,543 A | 1/1990 | Gullman | |
| 8,913,042 B2 | 12/2014 | Mercea et al. | |
| 9,983,696 B2* | 5/2018 | Yoneoka | G06F 3/0383 |
| 10,936,092 B1* | 3/2021 | Baugh | G06F 3/0346 |
| 2006/0181525 A1 | 8/2006 | Larsen et al. | |
| 2007/0289784 A1 | 12/2007 | Lapstun et al. | |
| 2008/0165162 A1 | 7/2008 | Zloter et al. | |

(Continued)

FOREIGN PATENT DOCUMENTS

| | | |
|---|---|---|
| CN | 102027437 A | 4/2011 |
| WO | 2017007800 A1 | 1/2017 |

OTHER PUBLICATIONS

Song et al., "Grips and Gestures on a Multi-Touch Pen", Retrieved from internet—https://www.cs.cornell.edu/~francois/Papers/MultiTouchPen.pdf, 2011, pp. 1323-1332.

*Primary Examiner* — Albert K Wong
(74) *Attorney, Agent, or Firm* — HP Inc, Patent Department (57) ABSTRACT

In one example, an electronic input device is described. The electronic input device includes a cylindrical shaft including a tip. A sensor housing of the electronic input device is disposed within an external housing. The sensor housing is parallel with, and surrounds, the cylindrical shaft. The electronic input device also includes a radial sensor(s) disposed on an inside diameter of the sensor housing. The sensor(s) are to sense, directly from the tip, radial force inputs against the tip.

14 Claims, 5 Drawing Sheets

(56) References Cited

U.S. PATENT DOCUMENTS

2012/0127110 A1 5/2012 Amm et al.
2016/0188013 A1 6/2016 Yoneoka et al.

* cited by examiner

ELECTRONIC INPUT DEVICES WITH RADIAL FORCE SENSOR ARRAY

BACKGROUND

Input devices are coupled to electronic devices such as computers, tablets, and other electronic devices. These input devices allow a user to input information to the electronic devices. One example of an input device is an electronic pen. The writing end of the electronic pen includes a tip that can be pressed on a surface, such as a touch-screen display. The contact force between the tip and the surface can be used to operate within an application, such as clicking on buttons/icons within the application. In some examples, the tip is moved across the surface, and a visual representation of the motion is displayed on the touch-screen display. In this fashion, the electronic pen can be used to write text, draw images, or interface with an application on the electronic device.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Input devices are coupled to electronic devices such as computers, tablets, and other electronic devices. These input devices allow a user to input information to the electronic devices. One example of an input device is an electronic pen. The writing end of the electronic pen includes a tip that can be pressed on a surface, such as a touch-screen display. The input device, or electronic pen can be used with other surfaces as well, such as paper designed to be used with electronic pens. While specific reference is made to a few types of surfaces, any number of surfaces could be implemented in accordance with the principles described herein.

The contact force between the tip and the surface can be used to operate within an application, such as clicking on buttons/icons within the application. In some examples, the tip is moved across the surface, and a visual representation of the motion is displayed on the touch-screen display, or other surface. In this fashion, the electronic pen can be used to write text, draw images, or interface with an application on the electronic device.

While such electronic pens allow a user to provide input to an electronic device, some characteristics limit their more thorough implementation. For example, when writing with a pencil or pen on a surface, varying the force exerted by the pencil or pen on the surface provides different outputs. For example, as a user increases the force with which they push down on the writing surface, the width, or darkness of the resulting line increases. With an electronic pen, this relationship between force and resulting output is difficult to replicate.

Accordingly, the present specification describes an electronic input device such as an electronic pen, with improved force sensitivity so as to increase the quality of the user's experience while using the electronic pen. That is, the electronic input device of the present specification is more responsive to variations in input force and input force direction, thus providing a more enriching user experience. The electronic input device includes a radial sensing unit. The radial sensing unit may refer to a radial force sensor array or a single ring-shaped sensor.

Specifically, the present specification describes an electronic input device. The electronic input device includes a cylindrical shaft that includes a tip. A sensor housing of the electronic input device is disposed within an external housing and is parallel with, and surrounds, the cylindrical shaft. A radial force sensor array is disposed on an inside diameter of the sensor housing. The sensors of the radial force sensor array directly sense, from the cylindrical shaft, radial forces against the tip.

In another example, the electronic input device includes the cylindrical shaft including a tip, which tip is to interface with a surface. The electronic input device includes a sensor housing disposed within an external housing. The sensor housing is parallel with, and surrounds, the cylindrical shaft. The sensor housing is adjacent the tip of the cylindrical shaft. The electronic input device also includes a radial array of multiple sensors disposed on an inside diameter of the sensor housing. The sensors are to sense, directly from a portion of the cylindrical shaft adjacent the tip, radial force inputs against the tip. In this example, the electronic input device includes an axial sensor adjacent an end of the cylindrical shaft opposite the tip. The axial sensor senses axial force inputs against the cylindrical shaft.

The present specification also describes an electronic input system. The electronic input system includes an external housing. The external housing includes an opening through which a tip of a cylindrical shaft protrudes. The system also includes an electronic input device disposed within the external housing. The electronic input device includes the cylindrical shaft including the tip, the sensor housing disposed within the external housing, and a radial sensing unit disposed on an inside diameter of the sensor housing at the opening of the external housing. The radial sensing unit senses, directly from a portion of the cylindrical shaft adjacent the tip, radial force inputs against the tip. The axial sensor of the electronic input device is disposed on an end of the housing opposite the tip of the cylindrical shaft to sense axial force inputs against the cylindrical shaft.

In one example, using such an electronic input device 1) exhibits enhanced force sensing sensitivity; 2) is more responsive to differentiations in user input force and direction; and 3) provides a user experience that more closely resembles a pen and paper experience. However, it is contemplated that the devices disclosed herein may address other matters and deficiencies in a number of technical areas.

As used in the present specification and claims, the term "direct" as in sense directly, indicates that no intermediary devices operate between the corresponding components. For example, a sensor that directly senses radial forces from a portion of the cylindrical shaft, interacts directly with the cylindrical shaft, without any intermediary component between the cylindrical shaft and the sensor.

Further, as used in the present specification and in the appended claims, the term "electronic pen" refers to an electronic input device that imitates a pen.

Still further, as used in the present specification and in the appended claims, the term "axial" refers to a force or direction that is collinear with the longitudinal axis of the electronic input device.

Even further, as used in the present specification and in the appended claims, the term "a number of" or similar language is meant to be understood broadly as any positive number including 1 to infinity.

Figure 1A:
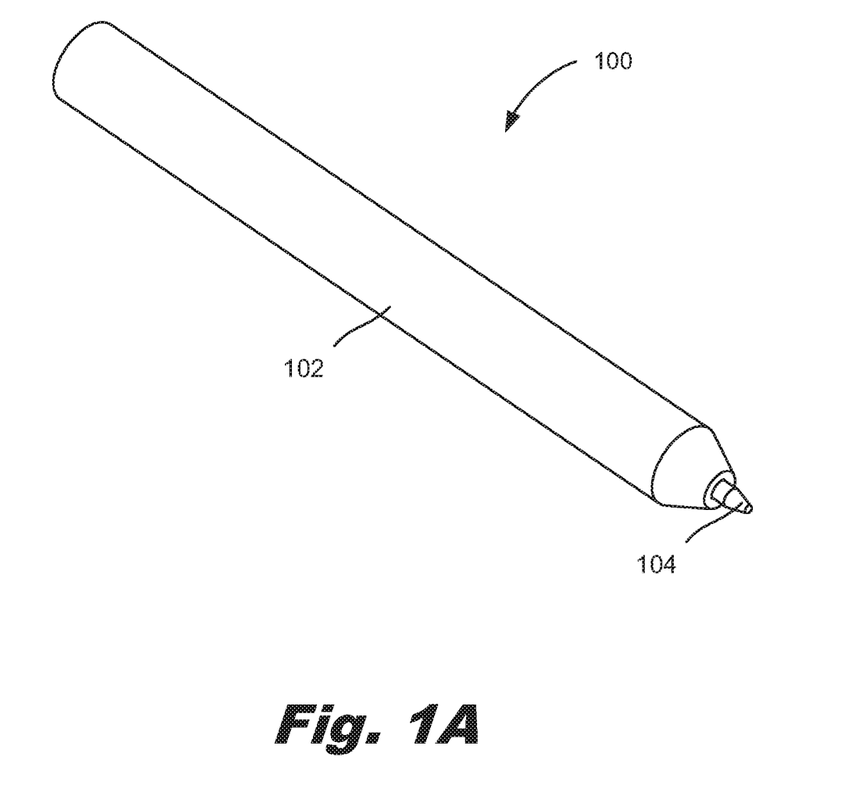
FIGS. 1A and 1B are views of an electronic input system with an electronic input device that includes a radial force sensor array, according to an example of the principles described herein.
Figure 1B:
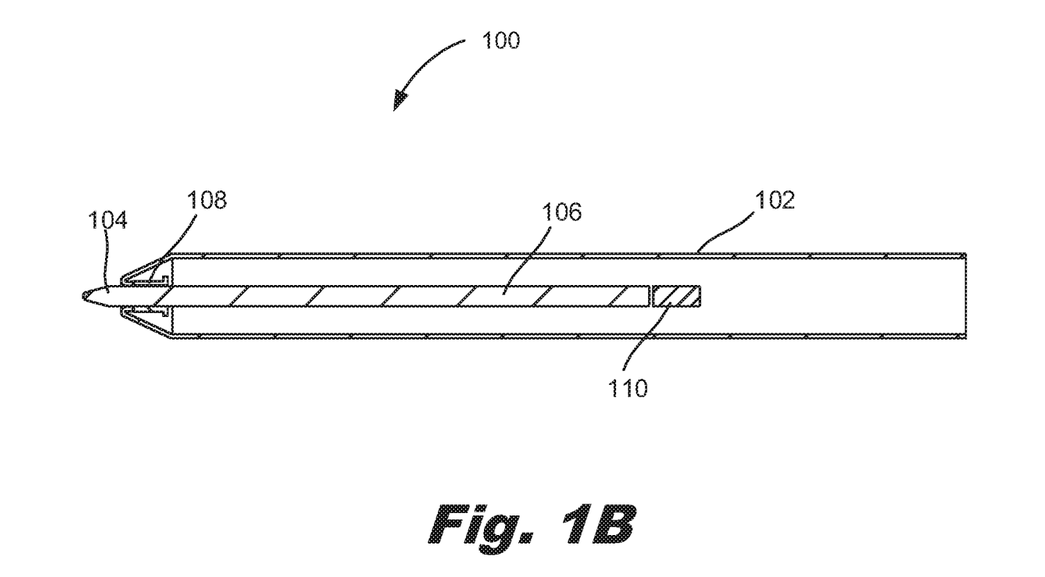

Turning now to the figures, FIGS. 1A and 1B are views of an electronic input system (100) with an electronic input device that includes a radial force sensor array, according to an example of the principles described herein. Specifically, FIG. 1A is an isometric view of the electronic input system (100) with the electronic input device that includes a radial force sensor array and FIG. 1B is a cross-sectional view of the electronic input system (100) with an electronic input device that includes a radial force sensor array.

The electronic input system (100) includes an external housing (102). The external housing (102) holds the other components of the electronic input system (100). For example, as depicted in FIG. 1B, the electronic input device, which includes a cylindrical shaft (106) and sensor housing (108) and in some examples an axial sensor (110), is disposed in the external housing (102). The external housing (102) may house other components such as processors and other circuitry and hardware.

The external housing (102) also provides a surface which a user can grasp to manipulate the electronic input device. In some examples, the external housing (102) has a rubber sleeve, or other ergonomic feature, disposed along at least a portion of its length to provide a grip. The grip provides a greater friction force such that a user can grasp the external housing (102) and more easily manipulate the electronic input device to interact with the surface. The external housing (102) may be formed of any material such as plastic or metal.

The external housing (102) has an opening through which a tip (104) of a cylindrical shaft (106) protrudes. The tip (104) of the cylindrical shaft (106) being the part of the cylindrical shaft (106) that interfaces with the surface. That is, a user grasps the external housing (102) and brings the tip (104) into contact with a surface. As the tip (104) moves across the surface, a visual representation is made on a display (e.g., the surface) that corresponds to the movement of the tip (104). In some examples, contact of the tip (104) with the surface causes a function to execute on an electronic device to which the surface is coupled. For example, a user may tap on a certain portion of the surface with the tip (104) to position a cursor on that portion of the surface. In another example, a user may tap on an icon on the surface, and an operation may be executed on the electronic device. In some examples, the cylindrical shaft (106) may be formed of metal and the tip (104) may be a rounded plastic nib so as to not damage the surface with which it interacts. In other examples, the tip (104) may be formed of another material, such as rubber.

In some examples, the cylindrical shaft (106) is removable from the external housing (102). For example, over time and with use, the tip (104) may wear down. In another example, the tip (104) may break off. In these and other examples, the removable cylindrical shaft (106) with a worn down, or otherwise damaged tip (104), can be removed and replaced with another cylindrical shaft (106).

The surface with which the tip (104) interfaces may be of a variety of types. For example, the surface may be a display screen on an electronic device, which display screen is responsive to touch inputs, such as from a finger or other device such as an electronic pen. In another example, the surface may be a paper surface that is specially-prepared to receive electronic inputs. For example, this specially-prepared paper may include features that are imperceptible to the human eye. As the tip (104) passes over these features, it identifies the position of the tip (104) on the specially-prepared paper surface.

The electronic input system (100) also includes an electronic input device which is disposed within the external housing (102). The electronic input device includes various components to facilitate interaction with a surface such as a touch-screen display or the above-described specially-prepared paper. The cylindrical shaft (106) with its tip (104) are examples of these components that make up the electronic input device.

The electronic input device also includes a sensor housing (108). The sensor housing (108) is parallel with the cylindrical shaft (106) and surrounds a portion of the cylindrical shaft (106). As depicted in FIG. 1B, the sensor housing (108) is disposed within the external housing (102). More particularly, the sensor housing (108) is immediately adjacent the opening of the external housing (102) and is adjacent the tip (104) of the cylindrical shaft (106). In some examples, the sensor housing (108) is integrally formed with the external housing (102). In this example, while the cylindrical shaft (106) is removable, the sensor housing (108) may be more permanently integrated with the external housing (102).

The sensor housing (108) has formed therein a radial force sensor array. More specifically, the array of sensors may be disposed on an inside diameter of the sensor housing (108), surrounding the cylindrical shaft (106). As can be seen in FIG. 1B, the sensor housing (108), and thereby the sensors, are disposed at an opening of the external housing (102) adjacent the tip (104). By placing the sensors close to the tip (104) where surface interaction occurs, a heightened sensitivity, or increased resolution, of the force input on the tip (104) is possible.

The sensors within the sensor housing (108) sense radial force, and movement, of the cylindrical shaft (106). That is, as a tip (104) interfaces with the surface, the tip (104) deflects. The largest amount of deflection occurs at the tip (104). Accordingly, these sensors, by being placed close to the tip (104) can utilize even small deflections to provide a more sensitive detection of radial force applied to the tip (104). Based on which sensors of the array detect force, and an amplitude of the detected force, the visual representation on the display may change. For example, greater sensed force may correlate to a thicker visual representation generated on the connected device.

The placement of the sensors around a circumference of the cylindrical shaft (106) near the tip (104), also increases input force sensitivity. That is, with a single axial sensor, it may be difficult to determine if enough force is being applied to the electronic input device by the user to activate the electronic input device. Moreover, this single sensor may not be able to properly determine application force as it just determines force in a direction along the longitudinal axis of the pen. This axial force component may be smaller than radial components when the pen is used in an orientation non-orthogonal to the surface. Accordingly, by including a radial array of sensors that are near to the tip (104), greater force sensitivity is achieved, which increased force sensitivity increases the responsiveness of the electronic input system (100).

The electronic input device may also include an axial sensor (110). In some examples, the axial sensor (110) is disposed at an end of the cylindrical shaft (106) that is opposite the tip (104). The axial sensor (110) may provide additional data regarding application force. That is, in addition to the radial force sensing by the radial force sensor array, the axial sensor (110) senses axial force inputs against the cylindrical shaft (106). In other words, the electronic input system (100) of the present specification, by including axial sensors (110) and a radial force sensor array, provides additional force data, which expands the possible inputs received by a corresponding electronic device. In some examples, the axial sensor (110) verifies the data received from the sensors within the radial array of sensors.

Figure 2A:
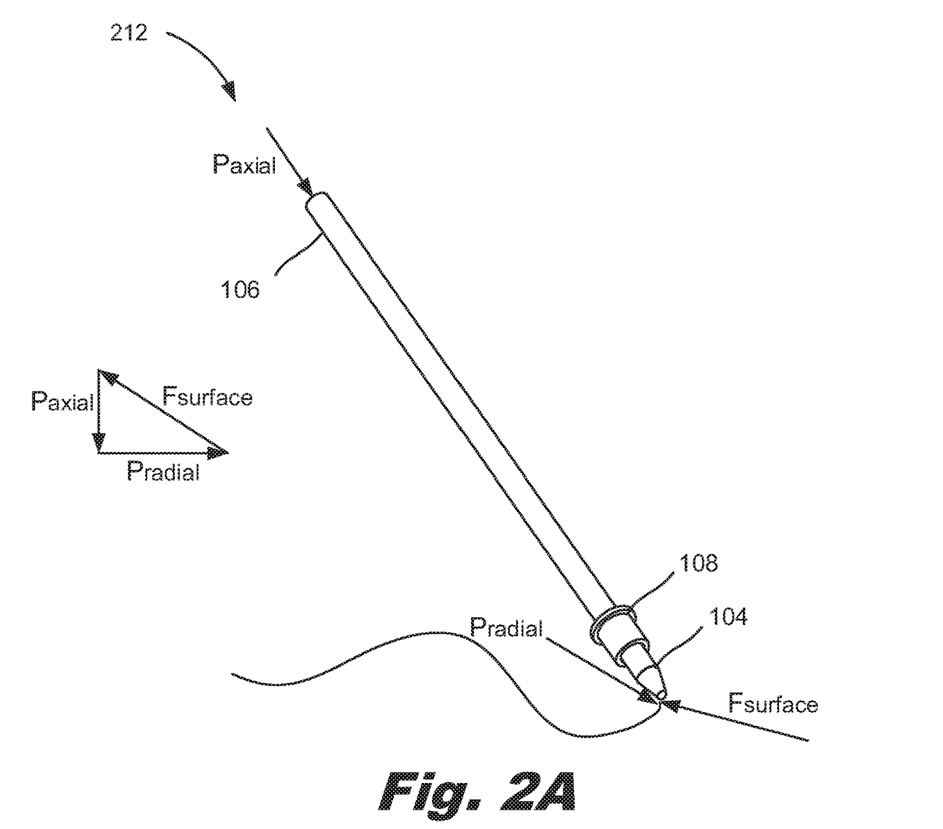
FIG. 2A is an isometric view of an electronic input device that includes a radial force sensor array and a force diagram, according to an example of the principles described herein.
Figure 2B:
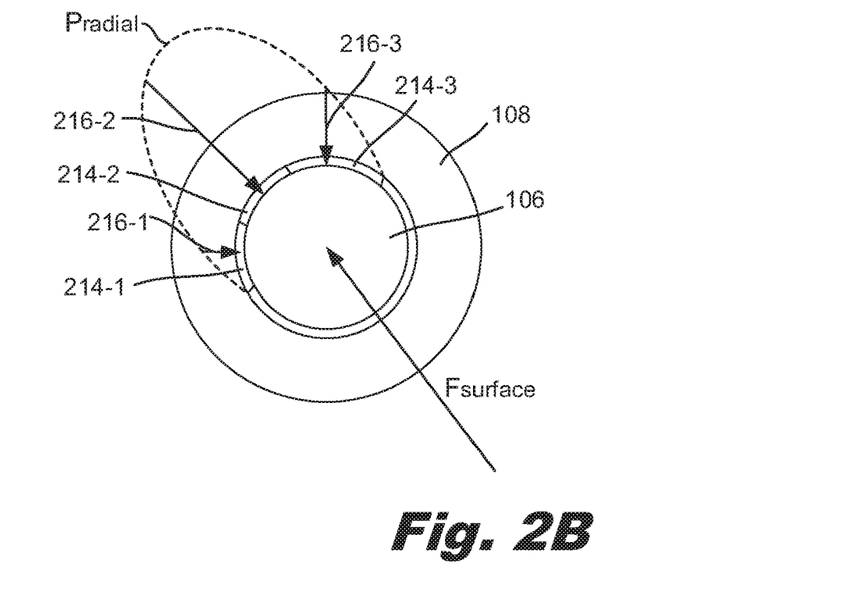
FIG. 2B. is an end view of the electronic input device that interacts with a surface and resulting forces against the electronic input device, according to an example of the principles described herein.

FIG. 2A is an isometric view of a subassembly of an electronic input device (212) that includes a radial force sensor array, according to an example of the principles described herein. FIG. 2B is an end view of the electronic input device (212) interfacing with a surface and the resulting forces against the electronic input device (212).

As described above, the electronic input device (212) includes a cylindrical shaft (106) with a tip (104) that interfaces with a surface. A sensor housing (108) surrounds a portion of the cylindrical shaft (106) and houses a radial force sensor array. FIG. 2A also clearly depicts the location of the sensor housing (108), and corresponding sensors, near the tip (104) of the cylindrical shaft (108).

FIG. 2B illustrates the improved sensitivity of the electronic input device (212) of the present specification. For example, a user, when using an electronic pen, may not apply force in a purely orthogonal direction relative to the surface. That is, due to the force of the surface during use, $F_{paper}$, against the electronic input device (212), there may be an axial component of the resulting force, $P_{axial}$, and a non-axial component of the resulting force, $P_{radial}$, the combination of which represents the total force of the surface against the tip (104) of the cylindrical shaft (106). As described above, a single axial sensor (FIG. 1, 110) may detect the axial component, $P_{axial}$, but may not detect, or may not detect with accuracy, the non-axial component of the force, $P_{radial}$. However, the electronic input device (212) of the present specification, implementing a radial force sensor array could detect such a non-axial component, $P_{radial}$. For example, due to the force of the surface against the tip (104), different sensors (214-1, 214-2, 214-3) sense different amplitudes of components (216-1, 216-2, 216-3) of the non-axial force component $P_{radial}$. Combining the output of these sensors (214) results in the non-axial force component, $P_{radial}$, which can be combined with the axial component, $P_{axial}$, to produce an accurate representation of the force resulting from interaction with the surface. That is, an output of the array of sensors (214) indicates a direction of the radial force input against the tip (104).

Figure 3:
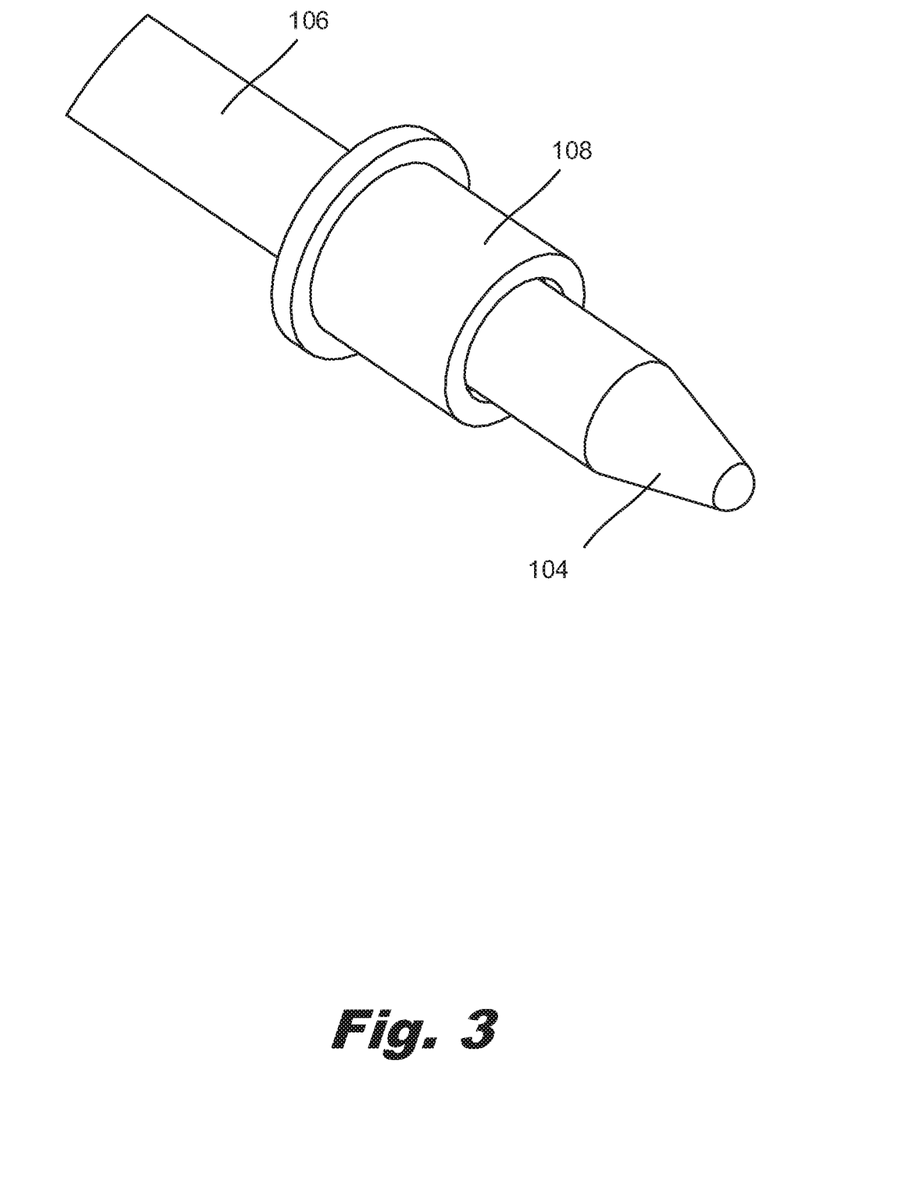
FIG. 3 is a zoomed-in isometric view of an electronic input device that includes a radial force sensor array, according to an example of the principles described herein.

FIG. 3 is a zoomed-in isometric view of an electronic input device (FIG. 2, 212) that includes a radial array of sensors (FIG. 2, 214), according to an example of the principles described herein. Specifically, FIG. 3 depicts a zoomed in view of the sensor housing (108) and the tip (104). As indicated in FIG. 3, the sensor housing (108) is immediately adjacent to the cylindrical shaft (106). In such an orientation, the sensors (FIG. 2, 214) directly sense the force applied to the cylindrical shaft (106). That is, there are no intermediate components between the cylindrical shaft (106) and the sensors (FIG. 2, 214). The sensors (214) may be force sensors that generate an output in response to contact forces. Accordingly, by directly sensing force on the cylindrical shaft (106), the contact force sensors (FIG. 2, 214) make contact with the cylindrical shaft (106). More specifically, the contact force sensors (FIG. 2, 214) directly sense force on the portion of the cylindrical shaft (106) immediately adjacent the tip (104) where the cylindrical shaft (106) exits the external housing (FIG. 1, 102). This contact occurs responsive to a radial force input against the cylindrical shaft (106), for example due to the force exerted against the tip (104) by the surface with which it is interacting. Direct sensing in this fashion increases the efficiency of force sensing as intermediate components introduce error to any force sensing system.

FIG. 3 also depicts the placement of the sensor housing (108) near the tip (104). For example, as depicted in FIGS. 1A and 1B, the sensor housing (108) and sensors are disposed at an opening through which the tip (104) of the cylindrical shaft (106) protrudes. Placing the sensor housing (108) close to the tip (104), at the opening of the external housing (FIG. 1, 102), increases sensitivity. That is, the most deflection of the cylindrical shaft (106) occurs at the tip (104). Accordingly, placing the sensor housing (108) and sensors (FIG. 2B, 214) at this point ensures a maximum amount of force is detected.

Figure 4:
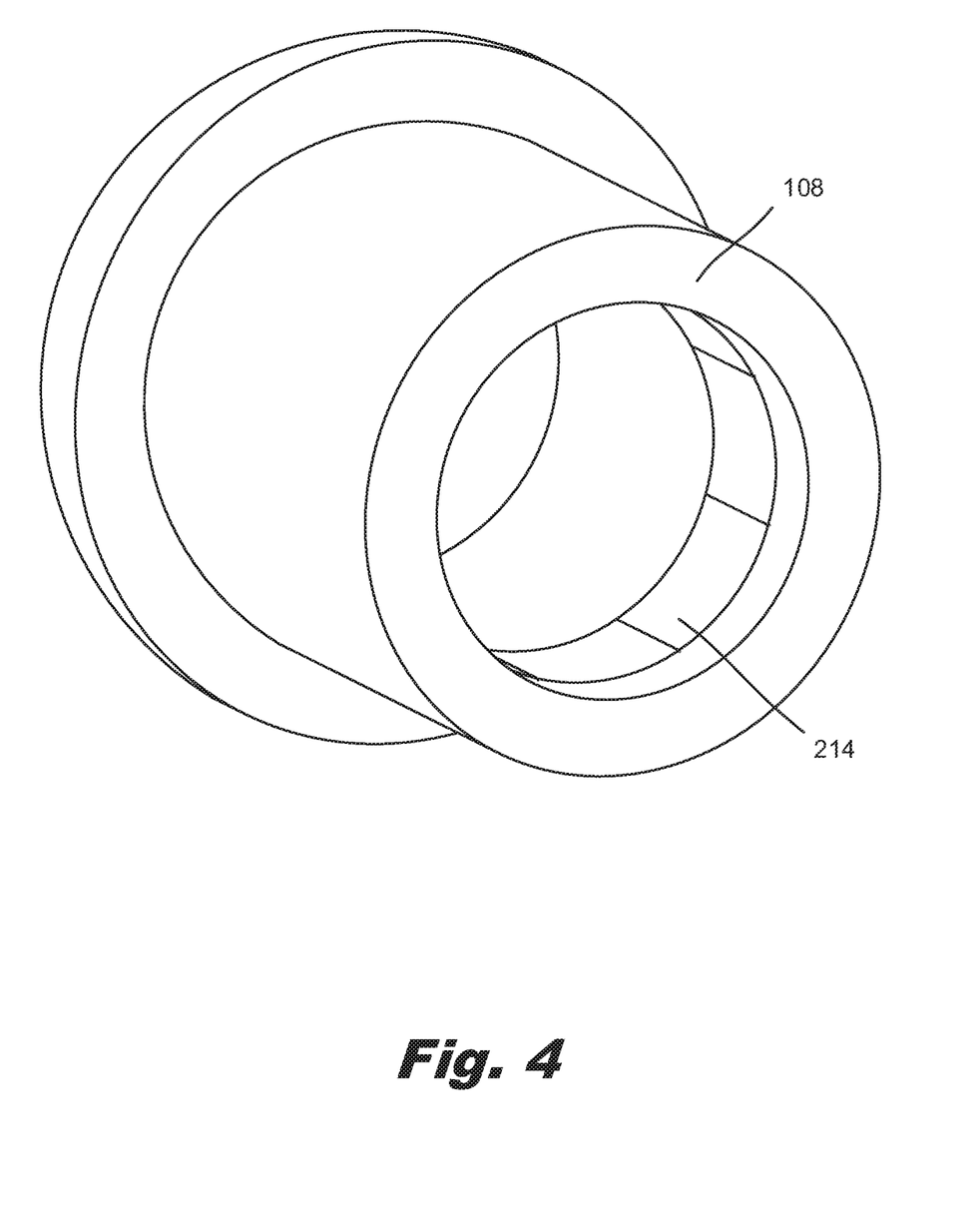
FIG. 4 is an isometric view of a sensor housing with a single row radial array of multiple force sensors, according to an example of the principles described herein.

FIG. 4 is an isometric view of a sensor housing (108) with a single row radial array of multiple sensors (214), according to an example of the principles described herein. For simplicity, in FIG. 4, a single sensor (214) of the multiple sensors (214) is depicted with a reference number. As depicted in FIG. 4, the sensors (214) may be in a single row. In another example, the array may include a single sensor (214) that is ring-shaped. In the example depicted in FIG. 4, the sensors (214) may be square sensors (214) with small dimensions. For example the sensors (214) may have a length less than 1.0 millimeters, or more specifically less than 0.5 millimeters. Sensors this small may allow for placement of the array of sensors (214) close to the tip (FIG. 1, 104) of the cylindrical shaft (FIG. 1, 106), i.e., the opening. By comparison, sensors with larger dimensions cannot be placed so near the tip (FIG. 1, 104). As depicted in FIG. 4, the sensors may be adjacent to one another. In other examples, the sensors (214) are spaced apart from one another, with a gap between adjacent sensors (214).

Figure 5:
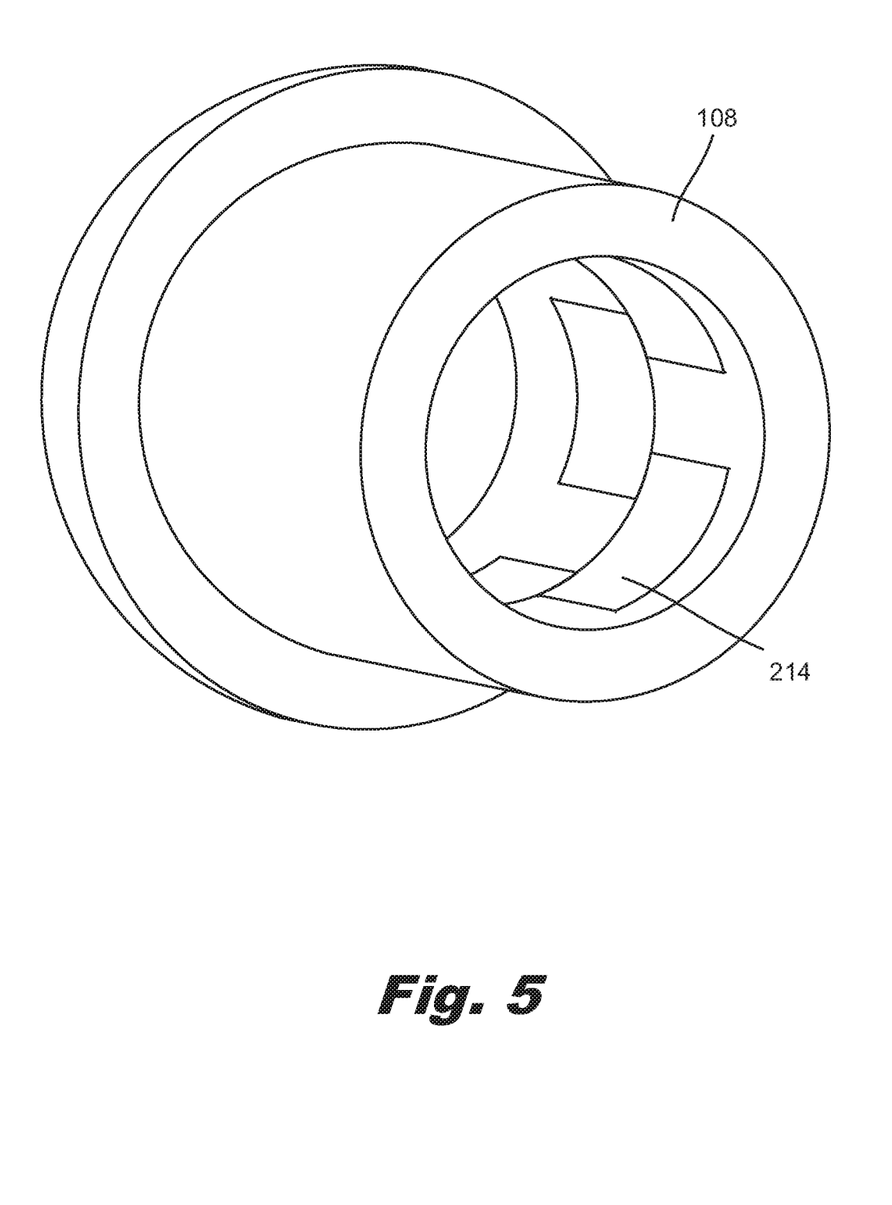
FIG. 5 is an isometric view of a sensor housing with a double row radial array of multiple force sensors, according to an example of the principles described.

FIG. 5 is an isometric view of a sensor housing (108) with a double row radial array of multiple sensors (214), according to an example of the principles described. For simplicity, in FIG. 5, a single sensor (214) of the multiple sensors (214) is depicted with a reference number. As depicted in FIG. 5, the sensors (214) may be in multiple rows. Doing so may accommodate sensors (214) of a larger size. As depicted in FIG. 5, the sensors may be staggered from one another, in other examples, the sensors (214) may be adjacent to one another.

In either of the examples depicted in FIG. 4 and FIG. 5, the sensors (214) each detect a component of a force resulting from interaction with a surface. That is, a sensor (214) detects an intensity of the force as seen by that particular sensor (214). Outputs may be combined to detect a directionality of the resulting force.

In some examples, the sensors (214) also trigger initiation of a visual representation of movement. That is, as described above, movement of the tip (FIG. 1, 104) across a surface generates a visual representation of the movement. However, in some examples, the pen, or rather the relationship between the pen and the surface is initialized before generating such a visual representation of the movement. This initialization can be triggered by contact detected by the sensors (214). As the sensor array of the present specification has increased force sensitivity, the array also has increased sensitivity to initiation of a movement of the pen and associated generation of a visual representation of the movement.

In one example, using such an electronic input device 1) exhibits enhanced force sensing sensitivity; 2) is more responsive to differentiations in user input force and direction; and 3) provides a user experience that more closely resembles a pen and paper experience. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. An electronic input device comprising:
   a cylindrical shaft including a tip;
   a sensor housing disposed within an external housing, the sensor housing being parallel with, and surrounding, the cylindrical shaft; and
   a radial array of sensors disposed on an inside diameter of the sensor housing, wherein the sensors are to sense directly from the tip, radial force inputs against the tip, wherein the sensors comprise force sensors to make contact with the cylindrical shaft responsive to a radial force input against the cylindrical shaft.

2. The input device of claim 1, wherein an output of the array of sensors indicates a direction of the radial force input.

3. The input device of claim 1, wherein the cylindrical shaft is a removable insert.

4. The input device of claim 1, further comprising an axial sensor adjacent an end of the cylindrical shaft opposite the tip, the axial sensor to sense axial force inputs against the cylindrical shaft.

5. The input device of claim 1, wherein the radial array of sensors comprises a single ring of sensors on the inside diameter of the sensor housing.

6. The input device of claim 1, wherein the radial array of sensors comprises multiple rings of sensors on the inside diameter of the sensor housing.

7. An electronic input device comprising:
   a cylindrical shaft including a tip, the tip to interface with a surface;
   a sensor housing disposed within an external housing, the sensor housing being parallel with, and surrounding, the cylindrical shaft, wherein the sensor housing is adjacent the tip of the cylindrical shaft;
   a radial array of multiple sensors disposed on an inside diameter of the sensor housing, wherein the sensors are to sense directly from the tip, radial force inputs against the tip, wherein the sensors comprise force sensors to make contact with the cylindrical shaft responsive to a radial force input against the cylindrical shaft; and
   an axial sensor adjacent an end of the cylindrical shaft opposite the tip, the axial sensor to sense axial force inputs against the cylindrical shaft.

8. The input device of claim 7, wherein the surface is an electronic surface.

9. The input device of claim 7, wherein surface is a paper surface.

10. The input device of claim 7, wherein outputs of multiple sensors are combined to determine a radial component of the force against the electronic input device.

11. An electronic input system, comprising:
    an external housing, the external housing including an opening through which a tip of a cylindrical shaft protrudes; and
    an electronic input device disposed within the external housing, the electronic input device comprising:
       the cylindrical shaft including the tip, the tip to interface with an electronic surface;
       a sensor housing disposed within the external housing, the sensor housing being parallel with, and surrounding, the cylindrical shaft; and
       a radial sensing unit disposed on an inside diameter of the sensor housing at the opening of the external housing, wherein the radial sensing unit is to sense, directly from the tip, radial force inputs against the tip, wherein the radial sensing unit comprises force sensors to make contact with the cylindrical shaft responsive to a radial force input against the cylindrical shaft; and
       an axial sensor disposed on an end of the housing opposite the tip of the cylindrical shaft to sense axial force inputs against the cylindrical shaft.

12. The electronic input system of claim 11, wherein the radial sensing unit comprises a radial array of multiple sensors.

13. The electronic input system of claim 11, wherein the radial sensing unit comprises a single ring-shaped sensor.

14. The electronic input system of claim 11, wherein the sensor housing is integral with the external housing.

\* \* \* \* \*